United States Patent
Evans

(10) Patent No.: US 9,575,918 B2
(45) Date of Patent: Feb. 21, 2017

(54) COLLABORATION SERVER

(71) Applicant: Acano (UK) Ltd, Middlesex (GB)

(72) Inventor: Simon Evans, Berkshire (GB)

(73) Assignee: Cisco Technology, Inc., San Jose, CA (US)

( * ) Notice: Subject to any disclaimer, the term of this patent is extended or adjusted under 35 U.S.C. 154(b) by 289 days.

(21) Appl. No.: 14/301,726

(22) Filed: Jun. 11, 2014

(65) Prior Publication Data

US 2014/0372662 A1 Dec. 18, 2014

(30) Foreign Application Priority Data

Jun. 12, 2013 (GB) .................................. 1310447.6

(51) Int. Cl.
*G06F 13/40* (2006.01)
*G06F 13/36* (2006.01)

(52) U.S. Cl.
CPC ........... *G06F 13/4022* (2013.01); *G06F 13/36* (2013.01)

(58) Field of Classification Search
CPC .............................. G06F 13/4022; G06F 13/36
See application file for complete search history.

(56) References Cited

U.S. PATENT DOCUMENTS

| | | | |
|---|---|---|---|
| 6,028,860 A * | 2/2000 | Laubach ............ | H04Q 11/0478 370/395.64 |
| 7,865,582 B2 * | 1/2011 | Santos ................. | G06F 9/5005 709/201 |
| 2004/0015638 A1 | 1/2004 | Forbes | |
| 2005/0021871 A1 | 1/2005 | Georgiou et al. | |
| 2005/0149624 A1 * | 7/2005 | Jakubiec ............... | H04L 12/403 709/217 |
| 2007/0097948 A1 | 5/2007 | Boyd et al. | |
| 2007/0124474 A1 * | 5/2007 | Margulis ................... | G06F 3/14 709/226 |
| 2007/0180182 A1 * | 8/2007 | Gostin ............. | G06F 15/17337 710/317 |
| 2007/0242602 A1 * | 10/2007 | Pang ..................... | H04L 12/462 370/216 |
| 2008/0147959 A1 | 6/2008 | Freimuth et al. | |
| 2009/0031017 A1 | 1/2009 | Elko et al. | |
| 2010/0325388 A1 | 12/2010 | Howard | |
| 2011/0051624 A1 | 3/2011 | Gnanasekaran et al. | |
| 2011/0292937 A1 * | 12/2011 | Gupta ..................... | H04L 45/16 370/390 |

OTHER PUBLICATIONS

GB Search Report for GB Application No. 1310447.6 issued on Nov. 22, 2013.

* cited by examiner

*Primary Examiner* — Farley Abad

(57) ABSTRACT

A collaboration server comprising: a switch fabric; and a plurality of processing modules, each processing module including a CPU core; wherein the plurality of processing modules are interconnected via the switch fabric.

20 Claims, 2 Drawing Sheets

COLLABORATION SERVER

FIELD OF THE INVENTION

The present invention relates to a collaboration server, particularly to a collaboration server suitable for audio and video conferencing.

BACKGROUND OF THE INVENTION

Improvements in smartphones, tablets and computers in recent years have led to an increased demand for flexibility when it comes to conference calls for the sharing of audio information, video information or other content such as remote desktop protocol packets. Collaboration servers provide freedom in the way that participants may communicate with one another to share audio, video and/or other information.

Cluster node servers for use with video conferencing systems are known. However, such systems suffer from poor performance, both in terms of performance per Watt and also in terms of performance per rack unit.

Multiprocessor (MP) servers are also known. However, such servers are cache coherent systems and therefore require special central processing units (CPUs) designed for cache coherence. These special CPUs are expensive which means that the MP servers themselves are also expensive. MP servers also suffer from poor power efficiency and so are expensive to run.

SUMMARY OF THE INVENTION

The present invention aims to solve the above problems by providing according to a first aspect, a collaboration server comprising a switch fabric; and a plurality of processing modules, each processing module including a CPU core; wherein the plurality of processing modules are interconnected via the switch fabric.

The switch fabric (also known as a "switch" or an "interconnect") of the collaboration server is directly exposed to software so that multiple isolated memory spaces exist. This contrasts with an MP server which consists of CPUs with links between them, the operation of this linked structure being transparent to software running on the MP server which sees just a single shared memory space. The collaboration server is therefore advantageous over an MP server because there is no need for cache coherence. This means expensive specially designed CPUs are not needed.

The switch fabric of the present invention provides a network topology where nodes connect with each other via one or more switches. The multiple physical links/interconnections of the network topology provide alternate routes for network traffic which is advantageous in that it provides for a reduction in network congestion. Furthermore, flexible interconnections enable tasks to be assigned dynamically using special algorithms. The tasks may be dynamically moved between processing modules to balance module load and interconnect load by placing a task which consumes the output of a previous task as topologically close as possible in the switch fabric.

Optional features of the invention will now be set out. These are applicable singly or in any combination with any aspect of the invention.

Preferably, the switch fabric comprises four switches arranged in a tree topology of a top switch and three leaf switches, each leaf switch being directly connected to the top switch and directly connected to each of the other leaf switches; wherein the plurality of processing modules includes three groups of processing modules: the first group comprising a plurality of processing modules each of which is directly connected to a first of the three leaf switches; the second group comprising a plurality of processing modules each of which is directly connected to a second of the three leaf switches; and the third group comprising a plurality of processing modules each of which is directed to a third of the three leaf switches.

Preferably, the switch fabric comprises at least one PCI Express (PCIe) switch. The switch fabric interconnects the processing modules by forming non-transparent PCIe bridges. In this way there is an intelligent device or processor at both sides of the bridge so that both sides of the bridge have an independent address domain.

In one embodiment, the switch fabric may be a single PCIe switch.

In another embodiment, the switch fabric comprises four PCIe switches arranged in a tree topology of a top PCIe switch and three leaf PCIe switches, each leaf PCIe switch being directly connected to the top PCIe switch and directly connected to each of the other leaf PCIe switches; wherein the plurality of processing modules includes three groups of processing modules: the first group comprising a plurality of processing modules each of which is directly connected to a first of the three leaf PCIe switches; the second group comprising a plurality of processing modules each of which is directly connected to a second of the three leaf PCIe switches; and the third group comprising a plurality of processing modules each of which is directed to a third of the three leaf PCIe switches.

Preferably, each connection between the top PCI Express (PCIe) switch and a leaf PCI Express (PCIe) switch has a width of 8 lanes. Preferably, each connection between two of the leaf PCIe switches has a width of 4 lanes.

Preferably, the collaboration server is configured such that the PCIe switches are capable of PCIe multicast to enable a source to address multiple destinations in a single transmission.

The single transmission may be a programmed input/output (PIO) write or may be a DMA transaction.

Optionally, the switch fabric is configured to transmit data via programmed input output (PIO).

Optionally the switch fabric is configured to transmit data via direct memory access (DMA). Where data is transmitted using DMA, the DMA preferably uses engines embedded in the switches or in the processing modules.

Preferably, at least one of the processing modules includes at least one of a GPU core and an MPU core.

Preferably, each of the processing modules comprises at least one of a GPU core and an MPU core.

Even more preferably, each of the processing modules comprises a GPU core and an MPU core.

The presence of one or more GPU or MPU cores in a processing module means that tasks can either be performed on CPU or GPU/MPU. This enables tasks to be dynamically assigned to different types of processing units in addition to being assigned to different processing modules. Certain tasks can either be performed on a CPU or a GPU/MPU. This enables the balancing of resources for lowest power and maximum density. In this way the performance per watt and performance density is improved to such an extent that the space taken up by the server is significantly smaller than competing pre-existing products. The collaboration server can be housed in a 2 U sized housing (i.e. a housing with a width of 19 inches and a height of 3.5 inches).

In terms of the type of tasks that can be performed on various types of processing unit, the server may be configured such that the CPU of one or more of the processing units is capable of carrying out one or more of the following tasks: video encode, video decode, video scaling, video enhancement, audio encode, audio decode, audio mixing, document rendering, remote desktop rendering, UI (User Interface) rendering and overlay, network packetisation and protocol encapsulation.

In addition, the server may also be configured such that the GPU of one or more of the processing units is capable of carrying out one or more of the following tasks: video scaling, video enhancement, remote desktop rendering, UI rendering and overlay.

In addition, the server may be configured such that the MPU of one or more of the processing units is capable of carrying out one or more of the following tasks: video encode, and decode.

The GPU and MPU tasks above are subsets of the CPU tasks. The tasks are dynamically assigned to a CPU, GPU or MPU so that they are performed in the unit which provides the greatest performance at lowest power, which is generally the GPU or MPU. They may also be performed on another unit (usually) CPU in order to balance overall load between the units. This approach maximises performance per watt and number of tasks concurrently executing in the system to achieve maximum density.

Preferably each processing module further comprises 3 additional CPU cores. In this way, there are 4 CPU cores per processing module.

Preferably, one of the plurality of processing modules is a master module, the master module being connected to participant ports such that, in use, all participants access the server via the master module.

Preferably, the system architecture of the server is shared over two boxes. In this way, sharing of the hardware over two boxes enables a larger number of processing modules to be interconnected.

According to a second aspect of the present invention, there is provided a collaboration server comprising: a switch fabric; and a plurality of processing modules, each processing module including a CPU core, and at least one of a GPU core and an MPU core; wherein the plurality of processing modules are interconnected via the switch fabric.

Preferably, each of the processing modules comprises at least one of a GPU core and an MPU core.

Even more preferably, each processing module comprises a GPU core and an MPU core.

According to a third aspect of the present invention, there is provided a collaboration server comprising: a switch fabric; and a plurality of processing modules, each processing module including a CPU core; wherein the plurality of processing modules are interconnected via the switch fabric; and the switch fabric comprises four switches arranged in a tree topology of a top switch and three leaf switches, each leaf switch being directly connected to the top switch and directly connected to each of the other leaf switches; and wherein the plurality of processing modules includes three groups of processing modules: the first group comprising a plurality of processing modules each of which is directly connected to a first of the three leaf switches; the second group comprising a plurality of processing modules each of which is directly connected to a second of the three leaf switches; and the third group comprising a plurality of processing modules each of which is directed to a third of the three leaf switches.

Further optional features of the invention are set out below.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
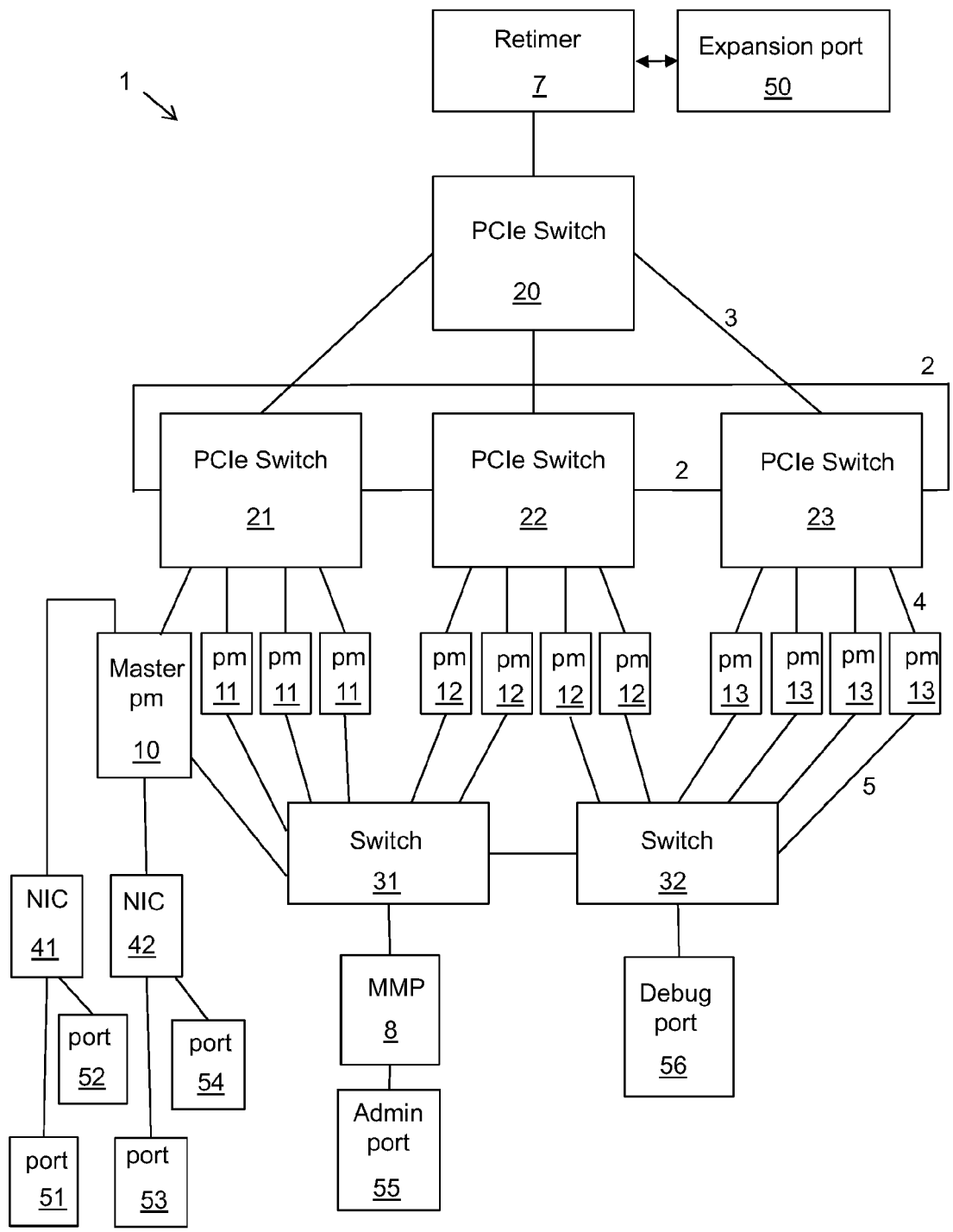
FIG. 1 shows a block diagram of the hardware architecture of the collaboration server of the present invention.

Referring to FIG. 1, the collaboration server 1 includes a plurality of processing modules 10, 11, 12, 13, each of which includes a central processing unit (CPU) core. The server 1 also comprises a switch fabric through which the processing modules 10, 11, 12, 13 are interconnected. In the embodiment shown in FIG. 1, the switch fabric takes the form of four Peripheral Component Interconnect Express (PCIe) switches 20, 21, 22, 23 arranged in a tree topology with a top PCIe switch 20 and three leaf PCIe switches 21, 22, 23. Each leaf PCIe switch is directly connected to the top PCIe switch and is also directly connected to each of the other leaf PCIe switches.

The plurality of processing modules 10, 11, 12, 13 is made up of three groups of processing modules. A first group of processing modules comprises a plurality of processing modules 10, 11 each of which is directly connected to a first of the three leaf PCIe switches 21. A second group of processing modules comprises a plurality of processing modules 12 each of which is directly connected to a second of the three leaf PCIe switches 22. A third group of processing modules comprises a plurality of processing modules 13, each of which is directly connected to a third of the three leaf PCIe switches.

The switch fabric interconnecting the processing modules is therefore formed of non-transparent PCIe bridges.

In the embodiment shown in FIG. 1, the switch fabric is either configured to transmit data from one processing module to another via programmed input/output or via direct memory access (DMA).

The DMA engines can be embedded in the switches or in the processing modules, or both. For example, the GPU of a processing module could be used to perform DMA.

In the embodiment shown in FIG. 1, each connection 3 between the top PCIe switch and a leaf PCIe switch has a width of 8 lanes. Each connection 2 between two of the leaf PCI switches has a width of 4 lanes.

In the embodiment of FIG. 1, each of the processing modules includes multiple resources (not shown) including four CPUs, a GPU and an MPU. The GPU core includes multiple execution units for graphics pixel operations (commonly known as "shaders"). The MPU includes multiple engines to perform specific operations for multiple video codecs e.g. H264 bitstream decode, H264 motion compensation, and RT Video motion compensation).

One of the plurality of processing modules is a master module 10. This master module is one of the first group of processing modules as it is directly connected to the first of the leaf PCIe switches. Two network interface cards (NIC) are connected to the master module. Each NIC in turn is connected to two ports forming a total of four ports 51, 52, 53, 54 which provide access to the server for a participant.

All participants access the server via the master module. One NIC is connected to the master module by a connection having a width of 8 lanes and the other NIC is connected to the master module by a connection having a width of 4 lanes. The two ports are typically 10 Gbps (gigabytes per second).

Two Ethernet switches 31, 32 form an Ethernet network used as a control plane. The Ethernet network is also used to bootstrap the processing modules under the control of a processor 8 which is described in more detail below. Each of the processing modules 10, 11, 12, 13 are connected to the one of the two Ethernet switches 31, 32 and the two switches 31, 32 are also connected to each other via an Ethernet connection.

One of the switches 31 is connected to an admin port 55 via a processor (MMP) 8. This small processor is responsible for system monitoring and management including bootstrap of the processing modules and control of fans. The other switch 32 is connected to a debug port 56.

The top PCIe switch forms an interconnect, with the other three PCIe switches as leaves. In addition, the top PCIe switch forms an entry/exit port for an external PCIe cable port (Expansion port) 50. The top PCIe switch is connected to the external/expansion port via a retimer. The retime is preferably a "Gen2 retimer" which ensures signal integrity over the external cabling used to connect boxes together via PCIe.

Figure 2:
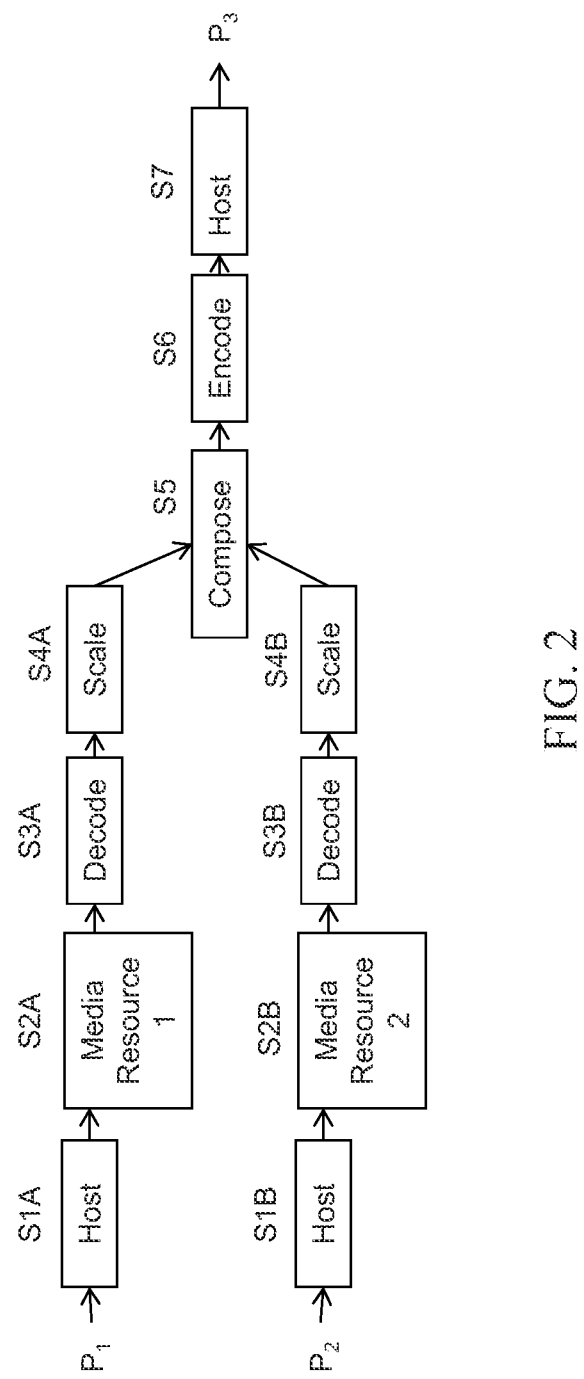
FIG. 2 is an example of a pipeline of tasks carried out by the collaboration server.

FIG. 2 shows a pipeline of tasks representative of the type of operations that can be performed using the server when two participants $P_1$ and $P_2$ use the server to communicate with a third participant $P_3$.

In a first step S1A, S1B, ingress network processing of compressed media data (such as video packets or remote desktop protocol packets) from each of the two participants is performed. This step must be carried out by a CPU of a processing module.

In a second step, S2A, S2B, the compressed media data for each participant is forwarded to a media resource residing on a processing module. This step is carried out by the DMA engine. Media resource 1 and media resource 2 may be the same or different physical modules.

In a third step, S3A, S3B, the video stream or remote desktop protocol stream is decoded and decompressed. This step can be carried out on the CPU or MPU of a processing module.

If the server is configured such that the next step is to be performed on a different processing module to the processing module of the current step (S3A, S3B) the video stream/RDP stream is forwarded using DMA by a DMA engine.

In a fourth step S4A, S4B, the video stream or RDP stream is scaled to a target resolution. This may be a scale up in resolution or a scale down in resolution. This step can be carried out on a CPU or GPU. As with the third step S3A, S3B, if the server is configured such that the next step is to be performed on a different processing module to the processing module of the current step (S4A, S4B) the video stream/RDP stream is forwarded using DMA by a DMA engine.

In a fifth step, S5 the plurality of video and/or RDP streams are composed. This can be carried out by a CPU or a GPU.

In a sixth step, S6 the video stream is compressed and encoded. This is carried out by a CPU or MPU. The compressed data packets are then forwarded to the host using DMA.

In a seventh step, carried out at the CPU, egress network protocol encapsulation and scheduling is carried out.

As can be seen from the above, the majority of the tasks on the pipeline can be performed on either a CPU or a GPU/MPU.

The internal PCIe interconnect enables different tasks to reside on different processing modules modules and also enables tasks to be fanned out to multiple destinations. Fan-in or merge operations are also possible, for example when mixing one video stream with another.

While the invention has been described in conjunction with the exemplary embodiments described above, many equivalent modifications and variations will be apparent to those skilled in the art when given this disclosure. For example, as an alternative to the use of PCIe switches, the switch fabric may be a Field Programmable Gate Array (FPGA).

Accordingly, the exemplary embodiments of the invention set forth above are considered to be illustrative and not limiting. Various changes to the described embodiments may be made without departing from the scope of the invention.

What is claimed is:

1. A collaboration server comprising:
    a switch fabric that comprises a plurality of switches arranged in a tree topology of a top switch and a plurality of leaf switches, wherein the top switch is an interface for the switch fabric and each leaf switch is directly connected to the top switch and to each of the other leaf switches: and
    a plurality of processing modules, each processing module including a CPU core;
    wherein the plurality of processing modules are interconnected via the switch fabric and includes one or more groups of processing modules each of which is directly connected to an associated leaf switch such that the top switch is in communication with the one or more groups of processing modules via the associated leaf switch.

2. The collaboration server of claim 1, wherein the switch fabric comprises four switches arranged in a tree topology of a top switch and three leaf switches; and
    wherein the plurality of processing modules includes three groups of processing modules:
        the first group comprising a plurality of processing modules each of which is directly connected to a first of the three leaf switches;
        the second group comprising a plurality of processing modules each of which is directly connected to a second of the three leaf switches; and
        the third group comprising a plurality of processing modules each of which is directed to a third of the three leaf switches.

3. The collaboration server of claim 1, wherein the switch fabric comprises at least one PCI Express (PCIe) switch.

4. The collaboration server of claim 2, wherein the switch fabric comprises at least one PCI Express (PCIe) switch, and wherein further each switch of the tree topology is a PCIe switch.

5. The collaboration server of claim 4 wherein the connection between the top PCIe switch and a leaf PCIe switch has a width of 8 lanes.

6. The collaboration server of claim 4, wherein each connection between two of the leaf PCIe switches has a width of 4 lanes.

7. The collaboration server of claim 4, configured such that the PCIe switches are capable of PCIe multicast to enable a source to address multiple destinations in a single transmission.

8. The collaboration server of claim 4, wherein the switch fabric is configured to transmit data via programmed input output (PIO).

9. The collaboration server of claim 4, wherein the switch fabric is configured to transmit data via direct memory access (DMA).

10. The collaboration server of claim 9, wherein the DMA uses engines embedded in the switches or in the processing modules.

11. The collaboration server of claim 1, wherein at least one of the processing modules includes at least one of a GPU core and an MPU core.

12. The collaboration server of claim 11, wherein each of the processing modules comprises at least one of a GPU core and an MPU core.

13. The collaboration server of claim 1, wherein each processing module further comprises 3 additional CPU cores.

14. The collaboration server of claim 1, wherein one of the plurality of processing modules is a master module, the master module being connected to participant ports such that, in use, all participants access the server via the master module.

15. A collaboration server comprising:
a switch fabric that comprises a plurality of switches arranged in a tree topology of a top switch and a plurality of leaf switches, wherein the top switch is an interface for the switch fabric and each leaf switch is directly connected to the top switch and to each of the other leaf switches: and
a plurality of processing modules, each processing module including a CPU core, and at least one of the processing modules including a GPU core and/or an MPU core;
wherein the plurality of processing modules are interconnected via the switch fabric and includes one or more groups of processing modules each of which is directly connected to an associated leaf switch such that the top switch is in communication with the one or more groups of processing modules via the associated leaf switch.

16. A collaboration server comprising:
a switch fabric; and
a plurality of processing modules, each processing module including a CPU core;
wherein the plurality of processing modules are interconnected via the switch fabric; and
the switch fabric comprises four switches arranged in a tree topology of a top switch and three leaf switches, each leaf switch being directly connected to the top switch and the plurality of processing modules leaf switches; and
wherein the plurality of processing modules includes three groups of processing modules:
the first group comprising a plurality of processing modules each of which is directly connected to a first of the three leaf switches;
the second group comprising a plurality of processing modules each of which is directly connected to a second of the three leaf switches; and
the third group comprising a plurality of processing modules each of which is directed to a third of the three leaf switches.

17. The collaboration server of claim 1, further comprising a control plane directly connected to each of the plurality of processing modules.

18. The collaboration server of claim 17, wherein the control plane further comprises one or more Ethernet switches such that each Ethernet switch is directly connected to each other and each of the plurality of processing modules is directly connected to at least one of the one or more Ethernet switches.

19. The collaboration server of claim 17, further comprising a management processor that is directly connected to the control plane, wherein the management processor monitors the plurality of processing modules.

20. The collaboration server of claim 1, further comprising a master processor that is in communication with an access server such that the master processor routes data between the switch fabric and the access server.

* * * * *